United States Patent
Fleming, Jr. et al.

[11] 4,011,006
[45] * Mar. 8, 1977

[54] $GeO_2$-$B_2O_3$-$SiO_2$ OPTICAL GLASS AND LIGHTGUIDES

[75] Inventors: James William Fleming, Jr., Piscataway; Raymond Edward Jaeger, Basking Ridge; Thomas John Miller, Green Brook, all of N.J.

[73] Assignee: Bell Telephone Laboratories, Incorporated, Murray Hill, N.J.

[*] Notice: The portion of the term of this patent subsequent to May 4, 1993, has been disclaimed.

[22] Filed: Dec. 17, 1975

[21] Appl. No.: 641,651

Related U.S. Application Data

[62] Division of Ser. No. 509,652, Sept. 26, 1974, Pat. No. 3,954,431.

[52] U.S. Cl. .................... 350/96 M; 65/3 A; 65/DIG. 7; 106/5 D; 106/54; 350/96 WG; 428/373
[51] Int. Cl.² .................... C03C 3/08; G02B 5/14
[58] Field of Search .................... 106/47, 50, 54, 52; 350/96 WG; 65/3 A

[56] References Cited
UNITED STATES PATENTS

| | | | |
|---|---|---|---|
| 1,526,423 | 2/1925 | Keyes | 106/54 |
| 1,607,817 | 11/1926 | Dennis | 106/47 R |
| 3,645,779 | 2/1972 | Kienel | 106/52 |
| 3,778,132 | 12/1973 | Pinnow | 350/96 WG |
| 3,806,570 | 4/1974 | Flamenbaum et al. | 106/52 X |
| 3,864,113 | 2/1975 | Dumbaugh et al. | 65/3 A |
| 3,884,550 | 5/1975 | Maurer et al. | 106/50 X |
| 3,938,974 | 2/1976 | Macedo et al. | 65/30 |

Primary Examiner—Helen M. McCarthy
Attorney, Agent, or Firm—Allen N. Friedman

[57] ABSTRACT

High silica content optical glasses, containing more volatile oxides such as $GeO_2$ and $B_2O_3$, are produced by plasma fusion of powders without inordinately high loss of the more volatile constituents. The powders are produced by a process including the heat treatment of intimately mixed materials, which include the glass forming constituents. Small quantities of $GeO_2$ are included in borosilicate glass to suppress bubble formation. Pairs of glass compositions have been found, with sufficient index of refraction difference to produce guidance in optical transmission lines, while possessing sufficient thermal expansion match to reduce stresses in the line.

3 Claims, 3 Drawing Figures

$GEO_2$-$B_2O_3$-$SIO_2$ OPTICAL GLASS AND LIGHTGUIDES

This application is a division of application Ser. No. 509,652, filed Sept. 26, 1974 now U.S. Pat. No. 3,954,431.

BACKGROUND OF THE INVENTION

1. Field of the Invention

The invention relates to the production of high quality optical glasses suitable for incorporation in devices such as lenses and optical transmission lines.

2. Brief Description of the Prior Art

Flame fusion and plasma fusion have been used to form various crystalline and glassy materials using gaseous and particulate feed stocks together with reactive and inert carrier gases (*Journal of Applied Physics*, 32 (12) p. 2534; Offlegungsschrift No. 2,239,249 Mar. 8, 1973 in German Patent Office). There has been a great deal of recent effort directed to the fabrication of glasses for use as waveguides in the optical and near optical region of the electromagnetic spectrum (*Proceedings of the I.E.E.E.*, 61 (1973) p. 452). Such optical waveguides are required to have a higher index of refraction region surrounded by a lower index of refraction region. The thrust of this work has been the provision of high index and low index glasses exhibiting little absorption or scattering loss at the wavelength desired for optical communication. Factors which effect these losses have been found to be the homogeneity, purity and composition of the glasses used.

Much investigation has been concentrated on fused silica and mixed oxide glasses with a high silica content (*Materials Research Bulletin*, 8 (1973) p. 469). Many of the mixed glasses investigated, including some of the apparently desirable glasses, include oxides which are significantly more volatile than silica at glass fusion temperatures. This fact presents a problem of composition control during fabrication due to loss of the more volatile constituents.

SUMMARY OF THE INVENTION

A method has been found for the production of mixed oxide glasses which include components which differ significantly in volatility at required glass melting temperatures. This method has been found to be adaptable to the production of glasses of high optical quality such as are useful for the production of optical waveguides. The processing steps of this method are compatible with the maintenance of high degrees of purity, uniformity and good composition control. The method consists essentially of the use of a plasma to fuse prereacted powders into a solid mass of optical glass. Exemplary experimental work has been done in the $SiO_2$—$GeO_2$—$B_2O_3$ system. Glass compositions have been developed for the core and cladding materials of optical waveguides which are sufficiently different in index of refraction to provide guidance yet sufficiently similar in coefficient of expansion to provide low levels of internal stress. In addition, it has been found that the inclusion of small amounts of $GeO_2$ in predominantly borosilicate glasses suppresses the formation of bubbles in the glass mass during fusion.

DETAILED DESCRIPTION OF THE INVENTION

Glass Compositions

High purity fused silica, $SiO_2$, has been shown to possess very little attenuation for electromagnetic radiation in the visible and near visible region of the spectrum. Thus, it has found use in optical devices and has been extensively investigated in connection with optical transmission for communications. Because of a desire to make devices incorporating glasses of different indexes of refraction, silica based glasses containing other oxides have been made. The glasses discussed here contain other oxides classified as "network formers" because they possess intermolecular bonding similar to $SiO_2$. Such oxides include $B_2O_3$, $GeO_2$, $SnO_2$, $V_2O_5$ and $Sb_2O_3$. Although such oxides melt or sublime at much lower temperatures than $SiO_2$ the inclusion of minor quantities (a total of less than 50 mole percent) of such oxides in a silica glass does not greatly reduce the temperature to which such glasses must be raised in order to be homogenized and fined. This presents a composition control problem and makes it difficult to incorporate them to more than 5 mole percent without inordinately high loss. This is obtained because these oxides all possess at least 1.5 times, and in most cases at least 10 times, the vapor pressure of $SiO_2$ at the required processing temperatures.

Figure 1:
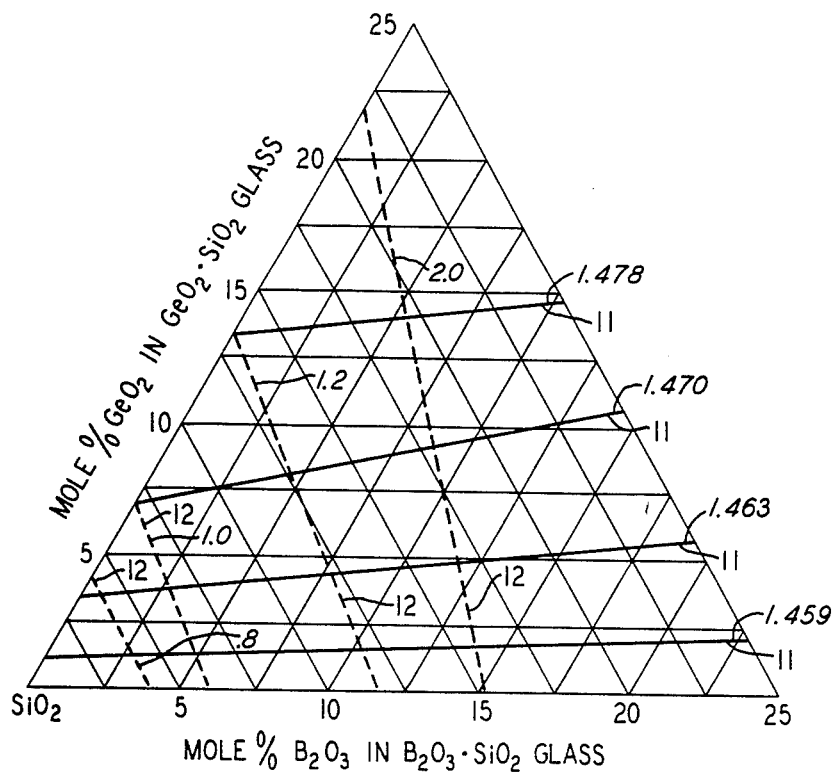
FIG. 1 is a ternary compositional diagram of exemplary glass compositions showing the approximate location of exemplary lines of constant index of refraction and constant coefficient of expansion.
Figure 2:
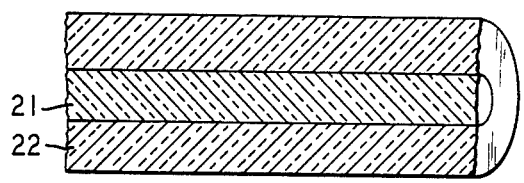
FIG. 2 is an elevational view in section of an exemplary portion of an optical waveguide.

Exemplary of the glasses investigated and suggested for high quality optical use are the borogermanosilicate glasses represented in FIG. 1. FIG. 1 is a ternary compositional diagram representing glasses containing different proportions of $SiO_2$, $GeO_2$ and $B_2O_3$. This diagram shows exemplary lines of constant index of refraction at 0.589$\mu$m 11 (solid lines) and exemplary lines of constant coefficient of thermal expansion 12 (dashed lines) for annealed glasses in this system. When of suitably high purity and homogeneity, glasses in this system can be used for optical transmission lines (optical waveguides) such as shown in FIG. 2. Such transmission lines incorporate a higher index of refraction glass core 21 and a lower index of refraction glass cladding 22. The index difference required to obtain adequate guidance at any wavelength depends on the dimensions of the device and is commonly expressed in terms of the numerical aperture of the device. However, it is difficult to achieve guidance if the index difference is less than one half percent. Thus, the inclusion of at least approximately 8 mole percent $GeO_2$ in a germanosilicate glass is needed if the other glass is a borosilicate glass.

In addition to index of refraction considerations, it is desirable to use glasses possessing coefficients of expansion which differ by less than 20 percent, in order to achieve low residual stress in the fabricated device. The use of glasses which differ in coefficient of expansion by less than 5 percent is preferable in this respect.

When made by the plasma fusion process discussed below it was found that the germanosilicate glasses possessed significantly fewer bubbles (essentially none in most cases) than the borosilicate glasses. It was particularly surprising that the inclusion of as little as 0.1 mole percent of $GeO_2$ in a borosilicate glass produced a significant reduction in bubble formation. Thus, the inclusion of from 0.1 to 5 mole percent $GeO_2$ in an otherwise pure borosilicate glass is recommended for bubble content reduction while holding the variation of refraction to within 10 percent of the total variation over the contemplated borogermanosilicate composition range. In an exemplary boule, a one mole percent $GeO_2$ glass was of pristine clarity while a neighboring borosilicate composition (approximately 15 mole percent $B_2O_3$) contained noticeable bubbles. The following pair of approximate glass compositions is recommended for optical transmission line use: (1) 85 mole percent $SiO_2$, 15 mole percent $GeO_2$ — core; (2) 85 mole percent $SiO_2$, 12.5 mole percent $B_2O_3$, 2.5 mole percent $GeO_2$ — cladding. Glasses of approximately these compositions can be used within the tolerance ranges desired by the device designer. Other composition pairs can be found by referring to FIG. 1, while considering index of refraction and coefficient of thermal expansion. The composition field shown in FIG. 1 (i.e., at least 75 mole percent $SiO_2$) is a preferred range. However, the production of glasses with at least 50 mole percent $SiO_2$ and less than approximately 40 mole percent $GeO_2$, $B_2O_3$ or other high volatility oxide benefits from the teaching of this disclosure.

Powder Production

Powders suitable for use in the production, by plasma fusion, of the above-described optical glasses have been produced by several methods. The following methods have proven most suitable when used in conjunction with the investigated glass system. However, other equivalent methods may find use in the production of other compositions. In one method a quantity of finely divided silica powder (for example, a powder with average particle size approximately 75 Angstroms) is combined with a solution containing constituents which, when in oxide form, constitute the other glass-forming materials. For example, an aqueous solution of ammonium pentaborate $((NH_4)_2B_{10}O_{16} \cdot 8H_2O)$ can be used when the production of a borosilicate glass is contemplated. The slurry is liquid dried by spraying into a quantity of flowing ammoniated acetone. The slurry is filtered and the filtered particles dried to produce the precursor material, which will subsequently be processed into the powders ultimately to be used to produce the optical glass boule.

In an alternate procedure all of the glass-forming materials are incorporated in solution and the mixed solution hydrolyzed by spraying into a quantity of ammoniated water. For example, tetramethoxy silane, $Si(OCH_3)_4$, trimethoxy borine, $B(OCH_3)_3$, and tetraethoxy germanium, $Ge(OC_2H_5)_4$, can be used when the production of borogermanosilicate glass is contemplated. Any one of a number of other organometallic or inorganic compounds may be used in this procedure (e.g., tetraethoxy silane, silicon tetrachloride, germanium tetrachloride and boric acid). Care must be taken, however, to consider the degree of solubility of any of these compounds in the liquid into which the mixture of compounds is sprayed. If one of the compounds has some degree of solubility in this liquid, a portion of that compound will be carried off during the filtering step and the original proportions must be adjusted to achieve the desired composition in the product powders. If the use of soluble compounds is indicated by economic or other reasons, an alternate procedure is the production of a gel which can be dried without filtering. Such a dried gel produces a light friable material which can easily be reduced to the desired particle size.

The damp powders produced by the filtering of the above produced slurries can be dried, for example, by placing them in an oven to bake in air or vacuum or other appropriate atmosphere at some elevated temperature. Exemplary powders have been dried in air or vacuum at approximately 110° C for times of more than 16 hours. This drying step produces a friable cake which can be gently crushed and screened to the desired particle size. Screening through a 20 mesh nylon screen has proved advantageous. The particulate matter thus produced is the precursor material for subsequent processing to the desired glassy powder.

The most desirable product for use in the ultimate plasma torch production of a glass boule would be bubble free, compositionally uniform and uniformly sized particles of the desired glass composition. It is the goal of the hereunder described powder preparation steps to approach as near as possible to this ideal. The basic requirement is a heat treatment which reduces the compounds used, to oxide form and combines the oxides to produce a glassy or at least partially glassy material. A two-step heat treatment has been found to be advantageous in this regard. The first step, some 200 to 400 centigrade degrees below the temperature of the subsequent step, serves to promote oxide formation and drive off volatile constituents leaving the glass forming materials primarily in oxide form. The second step, at a temperature between 750° C and 950° C for silicate glasses, serves to combine the oxides to particles as near as possible to the ideal described above. The second step heat treatment temperature is chosen to be as high as possible to maximize glass formation and compositional uniformity but not high enough to produce an inordinate amount of agglomeration of the particles. This latter consideration is particularly important when the highest degrees of production purity are required. If the heat treatment temperature is not too high, the product remains particulate or forms a light friable cake which is easily crushed without vigorous grinding or other pulverizing steps which would provide an avenue for the introduction of impurities.

For the best results in the plasma fusion steps it has been found to be desirable to use particles between a maximum and a minimum particle size. It has been found that particles which are too large to pass through approximately a 20 mesh screen are not sufficiently melted and fined during their course through the plasma flame. Particles which will pass through a 100 mesh screen exhibit an inordinate amount of loss through vaporization during their course through the plasma flame. Thus it has been found desirable to screen the heat treated powders through a 20 mesh screen onto a 100 mesh screen in order to produce powders for use in the plasma fusion step.

Plasma Fusion

Figure 3:
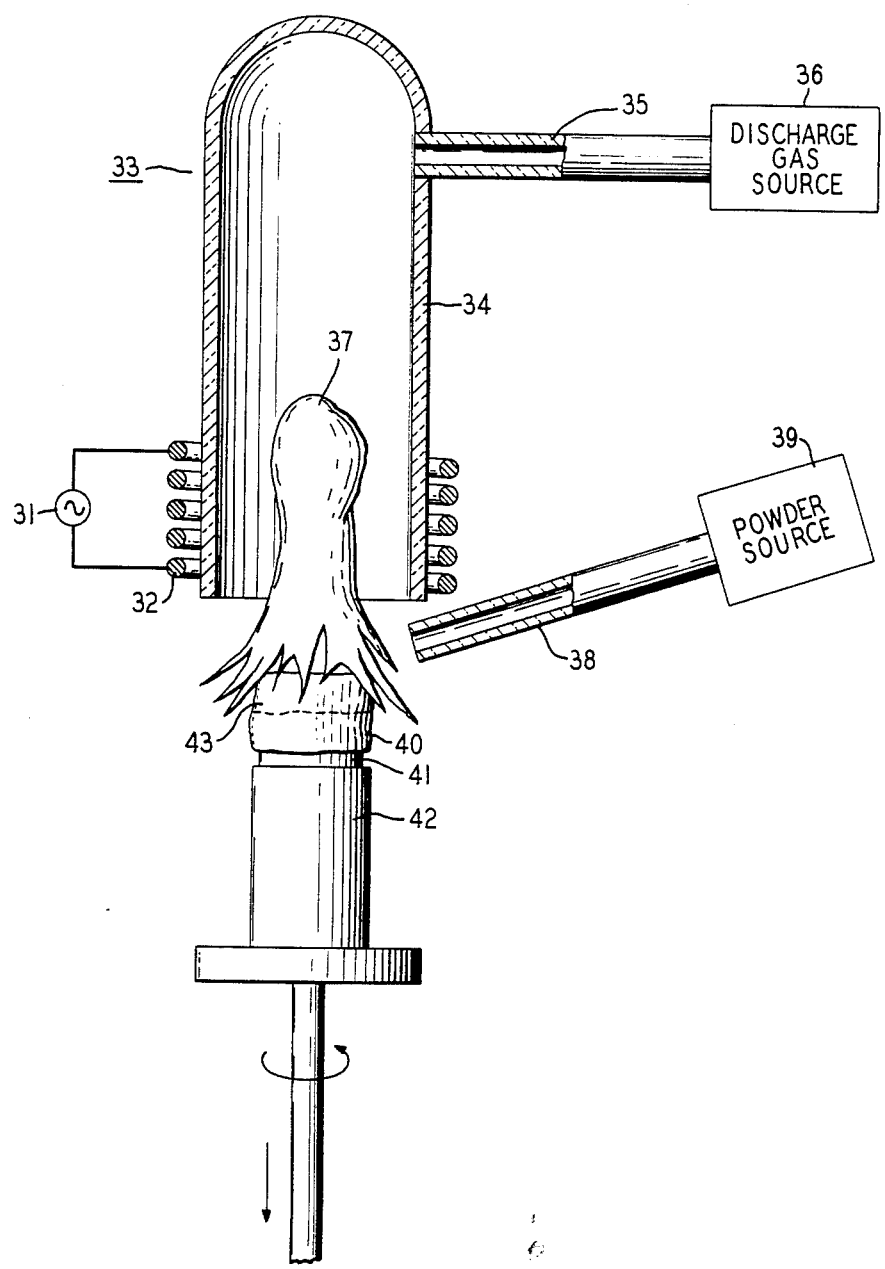
FIG. 3 is an elevational view in section, partially schematic, of an exemplary plasma fusion apparatus.

FIG. 3 shows an exemplary apparatus for the production of a boule of optical glass by the fusion of a powder in a plasma flame. In this apparatus a highpowered r-f generator 31 (of the order of 10 to 100 kilowatts) excites the coil 32 of a plasma torch 33. In this exemplary apparatus, the plasma torch consists of a fused silica mantle 34 connected by a tube 35 to a source of gas 36. The gas source 36 feeds the gas desired for the plasma discharge 37 into the mantle 34. The plasma discharge 37 produces an incandescent flame whose temperature can reach of the order of 20,000° C at its center. Plasma torches are described in the literature (e.g., *International Science and Technology*, June 1962, page 42).

The powders to be fused are directed into the flame 37 by a tube 38 from a powder source 39. In an exemplary apparatus the powder source 39 consisted of a vibratory powder feeder which continuously introduced a regulated quantity of powder into a stream of helium gas flowing at a rate of approximately 140 liters per hour. The power feed rate was adjusted somewhat after visual observation of the forming boule, starting at a rate of 200 grams per hour.

The powder-gas stream from the powder source 39 is directed against the center of the molten portion 43 of the forming boule 40. Boule formation is initiated by directing the powder-gas stream against a bait 41. The bait 41 is supported on a pedestal 42, which is rotated in order to promote the symmetry of the boule 40. The pedestal is lowered at a rate sufficient to keep the position of the molten 43 portion of the boule 40 constant relative to the flame 37 and feed tube 38.

EXAMPLES

Example 1

A powder containing 84.5 mole percent $SiO_2$ and 15.5 mole percent $B_2O_3$ was produced by stirring together 3.2 liters of triply distilled water, 186.7 grams of $(NH_4)_2B_{10}O_{16} \cdot 8H_2O$ and 309 grams of an amorphous silica powder having an average particle size of less than 100 A. The mixture was stirred for 2 hours at 60° C to produce a slurry. The slurry was sprayed into a stirred bath approximately 10 times its volume of a 25-to-1 by volume mixture of acetone and $NH_4OH$ solution. The $NH_4OH$ solution was 28 weight percent $NH_4OH$ in water. The resulting particles were filtered from the solution and dried at 110° C for at least 16 hours. The drying time and temperature are not critical.

The dried powder formed a friable cake, which was placed in a plastic bag and crushed. The resulting powder was passed through a 20 mesh nylon screen. The screened powders were placed in a fused silica dish and raising the temperature of the powder from room temperature at a rate of 200 centigrade degrees per hour in a furnace while the powder was exposed to air and heat treated at 600° C for 2 hours then at 750° C for 2 hours, cooled to 500° C in the furnace and removed to room temperature. The heat treated powder was a friable cake which was crushed gently in a plastic bag and screened through a 20 mesh nylon screen onto a 100 mesh nylon screen. The powder which did not pass through the 100 mesh screen was used to produce bulk glass by plasma fusion.

For fusion the powder was placed in a vibratory powder feeder, which fed the powder at a rate of approximately 200 grams per hour into a stream of helium gas flowing at approximately 140 liters per hour into a 3 mm inner diameter tube. The gas-powder mixture was directed into the plasma flame against the fused surface of the forming boule through a fused silica injection probe with a 3 mm inner diameter. Boule growth was initiated by directing the powders at the surface of a fused silica bait consisting of a 3.8 cm diameter plate, 0.3 cm thick. The bait and forming boule were rotated at 100 revolutions per minute and lowered at a rate sufficient to keep the molten surface of the forming boule at a constant position relative to the flame and the injection probe.

A boule of optical glass (containing few bubbles) approximately 5 cm in diameter and 5 cm long was produced. The composition of the glass was 84.5 mole percent $SiO_2$ and 15.5 mole percent $B_2O_3$.

Example 2

A powder containing 85.6 mole percent $SiO_2$, 4.9 mole percent $GeO_2$ and 9.5 mole percent $B_2O_3$ was produced by stirring together, at room temperature, 486 ml of tetramethoxysilane, $Si(OCH_3)_4$, 89.7 ml of trimethoxy borine, $B(OCH_3)_3$, and 44.2 ml of tetraethoxy germanium, $Ge(OC_2H_5)_4$. The solution was injected through a 0.01 mm diameter orifice into a swirling bath of 10 times its volume of an ammoniated water solution. The ammoniated water solution was made by mixing water and a 28 weight percent $NH_3OH$ aqueous solution in a 25:1 ratio by volume. The resulting particles were filtered and dried at 110° C for at least 16 hours. The drying time and temperature are not critical. The resulting material was processed to a powder between 20 mesh and 100 mesh size as in Example 1, except for the fact that the high temperature heat treatment took place for 4 hours at 925° C.

The resulting powder was fused into a boule of optical glass by a plasma fusion process essentially similar to Example 1. The composition of the glass was 87.5 mole percent $SiO_2$, 4.3 mole percent $GeO_2$ and 8.2 mole percent $B_2O_3$. This glass was essentially bubble free. Through the growth of several compositions it was determined that as little as 0.1 mole percent $GeO_2$ in a borosilicate glass was sufficient to greatly reduce or essentially eliminate bubble formation in these glasses.

The plasma flame was produced by a 35 kilowatt RF generator, exciting $O_2$ flowing at approximately 900 liters per hour in a 30 cm inner diameter plasma torch.

We claim:

1. A light transmitting device comprising a body of optical glass consisting of from 0.1 to 5 mole percent $GeO_2$, from 5 to 40 mole percent $B_2O_3$ and remainder $SiO_2$.

2. A light guide for transmitting light along a transmission path comprising a first glass which is the core in contact with a second glass which is the cladding along the transmission path CHARACTERIZED IN THAT the first glass is composed of from 8 mole percent to 40 mole percent $GeO_2$, remainder $SiO_2$, and the second glass is composed of from 5 mole percent to 40 mole percent $B_2O_3$, from 0.1 to 5 mole percent $GeO_2$, remainder $SiO_2$, so that the first glass and the second glass differ in index of refraction by more than one half percent and differ in coefficient of linear expansion by less than 20 percent.

3. A light guide of claim 2 in which the approximate composition of the first glass is 15 mole percent $GeO_2$, remainder $SiO_2$ and the approximate composition of the second glass is 12.5 mole percent $B_2O_3$, 2.5 mole percent $GeO_2$, remainder $SiO_2$.

* * * * *